United States Patent [19]

Beyer

[11] 4,456,346
[45] Jun. 26, 1984

[54] HINGE FOR SPECTACLES

[75] Inventor: Karl Beyer, Geneva, Switzerland

[73] Assignee: La Nationale S.A., Geneva, Switzerland

[21] Appl. No.: 328,583

[22] PCT Filed: Mar. 25, 1981

[86] PCT No.: PCT/CH81/00032

§ 371 Date: Nov. 25, 1981

§ 102(e) Date: Nov. 25, 1981

[30] Foreign Application Priority Data

Mar. 26, 1980 [CH] Switzerland .......................... 2368/80
Mar. 25, 1981 [EP] European Pat. Off. ..... 81/810-088-5

[51] Int. Cl.³ .......................... G02C 5/14; G02C 5/16
[52] U.S. Cl. .................................... 351/153; 351/121; 351/113; 16/228
[58] Field of Search .................... 351/153, 121, 113; 16/228

[56] References Cited

U.S. PATENT DOCUMENTS 3,957,360 5/1976 Villani .................................. 351/153

Primary Examiner—John K. Corbin
Assistant Examiner—Rodney B. Bovernick
Attorney, Agent, or Firm—Emory L. Groff, Jr.

[57] ABSTRACT

The spectacle hinge comprises two parts (3) and (4) in order to insure pivoting of the arm (1) on the frame (2). An intermediate part (5) is fixed on the part (3) by means of a screw (6) and includes a portion (11) forming a cam for engagement with an elastic element (12) of the part (4). The part (4) is pivoted on the part (5) by a screw 10' passing through a hole (10). By removing the intermediate part (5) a standard hinge can be pivotally connected to part (3) in order to provide a standard hinge, that is one which does not utilize elastic means.

3 Claims, 3 Drawing Figures

HINGE FOR SPECTACLES

Hinges for spectacles comprise two parts joined one to the other by means of a screw forming a pivot. There are known spectacle hinges referred to commonly as elastic hinges in which an elastic element mounted on one hinge part cooperates with another part in the shape of a cam on the other hinge part. A hinge of this type is, for example, described in U.S. Pat. No. 4,005,930.

Taking into account the desires of customers, merchants must have at their disposal spectacle frames of the same style but equipped with hinges of different types.

The present invention has for its object to decrease the number of parts which a merchant must carry in stock. With this in mind, the invention provides a hinge for spectacles comprising two parts, characterized in that it includes an intermediate detachable part providing means for rigidly attaching it to a first part, said intermediate part having a hole to receive a pivot member providing a hinge connection to a second part and a portion forming a cam cooperating with an elastic element of the second part in order to provide the elastic hinge.

The attached drawing shows schematically and by way of example a preferred form of execution of the hinge according to the present invention.

Figure 1:
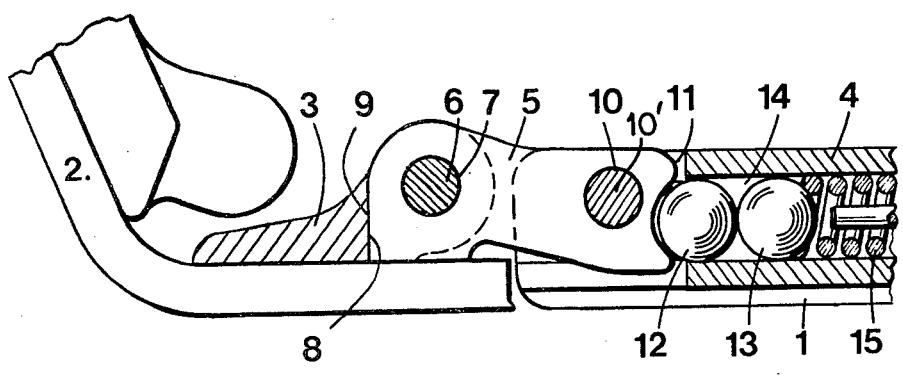
FIG. 1 is a fragmentary view partly in section of an elastic hinge, the arm of the spectacles being in an open position.
Figure 2:
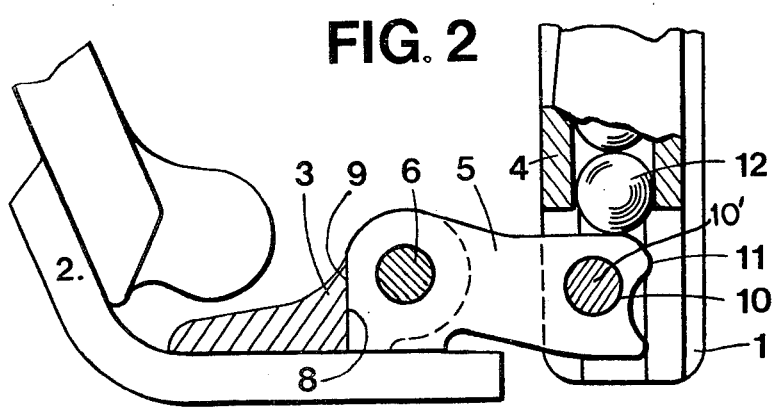
FIG. 2 is a view corresponding to FIG. 1 with the arm in a folded position.

Referring to FIG. 1 and 2, an arm 1 of the spectacles is pivoted on a frame 2 by means of a hinge assembly comprising a first part 3 and a second part 4.

The hinge is completed by an intermediate part 5 which is detachably mounted on the first part 3 by means of a screw 6 passing through holes in the part 3 and a hole 7 in the intermediate part 5. The latter is provided with a flat part 8 intended to bear against a flat part 9 of the part 3, these two flat parts cooperate so as to prevent rotation of the intermediate part 5 relative to part 3 around the screw 6.

The part 5 further includes a pivot hole 10 which receives a pivot member 10' providing a hinge connection with the second part 4. The part 5 also includes a portion forming a cam 11 which cooperates with an elastic element mounted on the second part 4. This elastic element comprises two balls 12 and 13 disposed in a cylindrical housing 14 of the second part 4 and the balls are submitted to the action of a spring 15 disposed in said housing. The spring 15 has the effect of pushing the ball 12 against the cam 11 in order to maintain the arm 1 either in the open position illustrated in FIG. 1 or in the folded position shown in FIG. 2.

Figure 3:
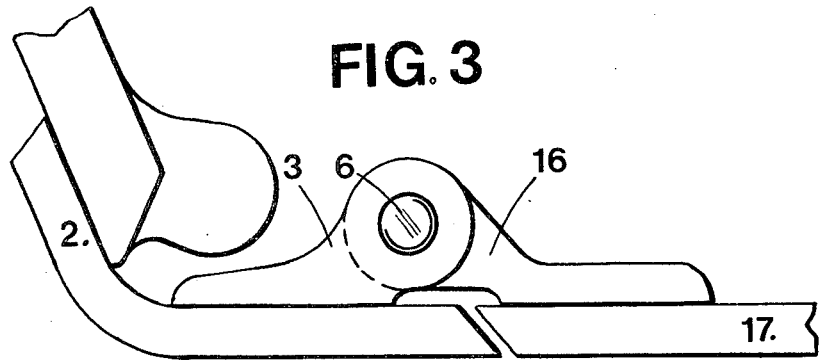
FIG. 3 is a plan view of the hinge mounted in a standard manner.

When the customer desires a standard hinge, it is sufficient to remove screw 6 in order to separate the intermediate part 5 from the part 3. At this point, and as illustrated in FIG. 3, the first part 3 is ready to receive a conventional hinge 16 of an arm 17 so as to provide the desired standard hinge.

It is understood that variations of the foregoing are possible. In particular, the attachment of the intermediate part 5 on the first part 3 could be achieved by means of a rivet instead of the screw 6 or by any other member functioning as a pin or bolt. The fixing in position of the intermediate part 5 could be obtained by cooperation of it directly with the frame, by example with a flat surface of the latter. This possibility is also seen from the drawing in the combination of the flat parts 8 and 9 of the intermediate part 5 and mounting part 3. Keeping the angular position of the intermediate part on the first hinge could also be obtained by other means than the flat parts 8 and 9. Thus, one could adjust the first part 3 and the intermediate part 5 in order that they be fixed one to the other by two screws. One could also provide these members with grooves and projections mutually engaging each other between the first part and/or the frame 2 and the intermediate part 5 in order to prevent any rotation between the two parts.

I claim:

1. A hinge for spectacles comprising first and second hinging parts characterized in that it comprises a detachable intermediate part including means for rigidly attaching it to said first part, said intermediate part having a hole therein, a pivot member fitted in said hole and connecting said intermediate part to said second part, said intermediate part including a cam, said second part including an elastic element cooperating with said cam to provide an elastic hinge.

2. A hinge according to claim 1 wherein, the means for rigidly fixing said intermediate part to said first part comprises a hole for the passage of a pin engaged in the pivot holes of the first part.

3. A hinge according to claim 2 wherein, said intermediate piece includes a flat face for abutment against a corresponding flat face of said first part and the mounting and is disposed so as to prevent its rotation around said screw.

* * * * *